(12) United States Patent
Girod et al.

(10) Patent No.: US 9,783,318 B2
(45) Date of Patent: *Oct. 10, 2017

(54) METHOD AND SYSTEM FOR TRIGGERING AN EMERGENCY MEASURE

(71) Applicant: Airbus Operations GmbH, Hamburg (DE)

(72) Inventors: Maurice Girod, Hamburg (DE); Matthew Greaves, Olney (GB); Uwe Bartels, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/846,170

(22) Filed: Sep. 4, 2015

(65) Prior Publication Data

US 2016/0075446 A1 Mar. 17, 2016

(30) Foreign Application Priority Data

Sep. 15, 2014 (EP) .................... 14184846

(51) Int. Cl.
*G08B 23/00* (2006.01)
*B64D 45/00* (2006.01)
*G06N 7/02* (2006.01)
*G08G 5/00* (2006.01)

(52) U.S. Cl.
CPC .............. *B64D 45/00* (2013.01); *G06N 7/02* (2013.01); *G08G 5/0013* (2013.01); *G08G 5/0021* (2013.01); *G08G 5/0056* (2013.01); *B64D 2045/0065* (2013.01)

(58) Field of Classification Search
CPC ........ B64D 45/00; G06N 7/02; G08G 5/0013; G08G 5/0021; G08G 5/0056
USPC .......................................................... 340/963
See application file for complete search history.

(56) References Cited

U.S. PATENT DOCUMENTS

| 6,278,913 B1 * | 8/2001 | Jiang .................... G07C 5/0858 244/158.1 |
| 8,706,357 B1 * | 4/2014 | van den Heuvel et al. ...................... B64D 45/00 701/14 |
| 2003/0128122 A1 | 7/2003 | Reynolds |
| 2005/0065667 A1 | 3/2005 | Weineck |

(Continued)

OTHER PUBLICATIONS

European Search Report for Application No. 14184845 dated Dec. 9, 2014.

(Continued)

*Primary Examiner* — Kerri McNally
(74) *Attorney, Agent, or Firm* — Jenkins, Wilson, Taylor & Hunt, P.A.

(57) ABSTRACT

A method for triggering a first emergency measure associated with an aircraft emergency comprising the steps of determining a risk level for an aircraft emergency and triggering the first emergency measure if the risk level exceeds a first threshold for the first emergency measure is described and claimed. The risk level is determined by evaluating a plurality of flight parameters and/or aircraft parameters using a predefined logic. The first threshold is adjusted according to a position of the aircraft over ground. Furthermore, a system for use onboard an aircraft for triggering a first emergency measure and an aircraft comprising such a system are disclosed.

19 Claims, 1 Drawing Sheet

(56) References Cited

U.S. PATENT DOCUMENTS

2012/0138741 A1    6/2012  Fabre
2013/0073120 A1    3/2013  Bailey et al.
2014/0180502 A1    6/2014  Dorneich et al.
2016/0075444 A1    3/2016  Girod et al.

OTHER PUBLICATIONS

Digitisation of technical documents/reports of Tech Coord Division [Tender documents: T25551138], MENA Report, Mar. 18, 2011 (Mar. 18, 2011), XP055179114, London.
European Search Report for Application No. 14184846 dated Mar. 27, 2015.
Non-Final Office Action for U.S. Appl. No. 14/840,142 dated Apr. 7, 2017.

* cited by examiner

METHOD AND SYSTEM FOR TRIGGERING AN EMERGENCY MEASURE

CROSS-REFERENCE TO RELATED APPLICATION

This application claims priority to European Patent Application No. 14184846.5 filed Sep. 15, 2014, the entire disclosure of which is incorporated by reference herein.

TECHNICAL FIELD

The present disclosure relates to a method for triggering a first emergency measure associated with an aircraft emergency. The method comprises determining a risk level for an aircraft emergency and triggering the first emergency measure if the risk level exceeds a first threshold for the first emergency measure. The risk level is determined by evaluating a plurality of flight parameters and/or aircraft parameters using a predefined logic. The disclosure herein further relates to a system for use onboard an aircraft for triggering a first emergency measure and to an aircraft comprising such a system.

BACKGROUND

If aircraft are in emergency situations, several emergency measures are provided e.g. Emergency Locator Transmitters notifying rescue personnel of a location of the aircraft or flight recorders that record flight and aircraft parameters to determine a cause of the emergency situation later on. Some of these emergency measures, such as the flight recorder, operate continuously whereas others such as the Emergency Locator Transmitters need to be activated. Emergency Locator Transmitters are nowadays equipped with acceleration sensors that activate the Emergency Locator Transmitter if high negative accelerations are sensed. The acceleration sensors essentially activate the emergency measure in the same moment an actual crash or impact occurs as the negative acceleration is a result of the impact. However, acceleration sensor based activation may be insufficient if the Emergency Locator Transmitter is not successfully activated in a crash or impact situation and as a consequence the Search And Rescue actions and the accident investigations are delayed.
There are examples of this malfunction behavior of current Emergency Locator Transmitters.

It appears that the transmitter is destroyed before the sensors detect that the aircraft experienced an impact or before the transmitter was able to establish a communications link and send an emergency signal and a current aircraft position. Hence, there is a need for a sufficiently early triggering, i.e. pre-crash, of emergency measures, such as Emergency Locator Transmitters.

Such pre-crash or pre-impact triggering is, for example, also required for initiating the transmission of flight recordings from the aircraft to a ground control in case of an emergency. These transmitted flight recordings facilitate a rapid accident investigation without having to search for the flight recorders and avoid high costs during regular flight caused by continuous transmissions of flight recordings.

A different problem arises with another emergency measure in form of Deployable Flight Recorders. Deployable Flight Recorders are equipped with sensors that trigger an ejection or deployment of the Deployable Flight Recorder. Here, the problem is not a late deployment of the Deployable Flight Recorders but rather unintended deployments due to malfunction of the sensors. An unintentionally ejected flight recorder might cause damage to the aircraft and, in particular, cause damage to wherever it drops onto the ground. Thus, there also is a need to prevent an unintended triggering of emergency measures such as Deployable Flight Recorders.

SUMMARY

In more general terms it is apparent from the description above that there is a need for an effective and robust automated method and apparatus for the detection of aircraft emergencies. To this end the Bureau d'Enquêtes et d'Analyses pour la sécurité de l'aviation civil (BEA) has established a "Triggered Transmission of Flight Data Working Group" which has published a report in 2011 describing the results of the working group. The working group focused on the general idea of evaluating flight parameters and other aircraft parameters to determine if an aircraft is in a normal flight situation or in an emergency situation.

In the report two methods are described for evaluating a plurality of flight and aircraft parameters. The methods employ either a Boolean or a fuzzy logic to determine if the aircraft is in a normal flight situation or an emergency situation. The evaluated parameters include general parameters defining flight maneuvers of the aircraft such as a roll angle, a roll rate, a pitch angle, a pitch rate, a calibrated airspeed (CAS), an indicated airspeed (IAS), an acceleration of the aircraft along the yaw axis or the roll axis and a radio altitude (i.e. an altitude above ground). Furthermore, other aircraft parameters indicating a state of the aircraft such as a stall warning, an overspeed warning, an excessive roll or rudder command, a terrain awareness and warning system (TAWS) warning, a traffic alert and collision avoidance system (TCAS) warning and a cabin altitude warning have also been evaluated. Sets of boolean and fuzzy logic rules were defined. These rules return an aircraft emergency or no aircraft emergency result. Both methods described in the report were able to detect most if not all emergencies in a study that evaluated several hundreds of recorded normal flight situations and several emergency situations. The fuzzy method exhibited a superior performance as, in contrast to the binary method, it did not cause any false alarms.

The fuzzy method mentioned above processes parameter value constellations using fuzzy mathematics and generates a statement "accident is occurring" with an associated truth value from 0 to 1 where 0 means "not true" and 1 means "true". A threshold upon this truth value then defuzzifies the statement. That is, if the truth value exceeds the threshold the trigger becomes positive. The threshold has been chosen conservatively so that no false alarms are generated. That is, the fuzzy method will trigger rather late, when there is no doubt any more that an accident will happen. Thus, the advantage of avoiding false alarms is achieved at the disadvantage that late triggers leave little time, e.g. for transmitting sufficient amounts of flight data.

Hence, there still appears to be a need to develop and improve methods used to trigger at least a first emergency measure, i.e. to determine accurately if an aircraft is in a normal flight situation or in an emergency situation. In particular, further improvements are needed that allow a sufficiently early detection of an aircraft emergency but also prevent unintended activation of emergency measures where activation by acceleration or crash sensors is additionally required.

In a first aspect the present disclosure solves the problem by providing a method for triggering a first emergency measure associated with an aircraft emergency, wherein the first threshold is adjusted according to a position of the aircraft over ground.

The disclosure herein is an improved, more effective approach for automatically triggering emergency measures. In contrast to the known methods it can adjust itself according to particular situations so that an optimum between early trigger time and likelihood of false alarms may be achieved depending on a situation. It is based on the calculation of risk levels and on thresholds upon the risk levels that trigger emergency measures when met or exceeded.

In other words the disclosure herein provides for a method and system for triggering or activating or initiating an emergency measure. An emergency measure can, for example, be an activation of an Emergency Locator Transmitter, i.e. a device that facilitates locating an aircraft using a radio frequency signal or a satellite signal, or an activation of a data transmission or an arming or deploying of a Deployable Flight Recorder.

An arming of a Deployable Flight Recorder can be a particularly advantageous embodiment of an emergency measure. A Deployable Flight or Data Recorder may be equipped or connected to crash or impact detection sensors and is adapted to be ejected if the crash or impact detection sensors indicate a crash or impact of the aircraft. If in a preferred embodiment the emergency measure is an arming of the Deployable Flight Recorder, the Deployable Flight Recorder is only ejected after detection of a crash if it has been armed beforehand. Thus, unintended deployments of the Deployable Flight Recorder due to a malfunction of a crash or impact detection sensor erroneously indicating a crash or impact are prevented as the Deployable Flight Recorder is only armed if a previously defined threshold has been exceeded by the risk level.

The method can comprise three separate parts. In one part a risk or risk level for an aircraft emergency has to be determined. An aircraft emergency can be any kind of distress that leads to an unintended termination of the flight of the aircraft and requires emergency measures to be taken. The term aircraft emergency may refer to accidents in general or only specific types of accidents such as controlled or uncontrolled flights into terrain or mid-air collisions. It is even possible to further restrict the term aircraft emergency to a specific kind of accident including the reason for or cause of the accident. However, in a preferred embodiment the term aircraft emergency refers in general to any kind of accident of an aircraft that either results in a loss of the aircraft or at least requires emergency measures to be taken.

The risk level is determined by evaluating a plurality of flight parameters and/or aircraft parameters using a predefined logic. Evaluating a plurality of parameters with a predefined logic consequently requires that also the parameters to be evaluated are predefined. Such parameters may include, for example, a roll angle and a roll rate of the aircraft, a pitch angle and a pitch rate, a vertical speed, i.e. a climb rate or rate of descent of the aircraft, a calibrated airspeed (CAS), an indicated airspeed (IAS), an acceleration of the aircraft along the yaw or normal axis or the pitch or lateral axis, a radio altitude (i.e. an altitude above ground), roll and rudder commands and engine parameters. Further, parameters indicating a flight situation such as a stall warning, an overspeed warning, a terrain awareness and warning system (TAWS) warning, a traffic alert and collision avoidance system (TCAS) warning, a bad take-off warning and a cabin altitude warning may also be evaluated.

The term logic refers to a set of equations or inequalities or rules for evaluating the parameters and to translate the evaluation into a risk or risk level for an aircraft emergency. In a preferred exemplary embodiment the logic is a fuzzy logic using a plurality of fuzzy sets to determine a risk of an aircraft emergency. Contrary to a conventional binary logic the state of a parameter of a fuzzy logic may be expressed and mathematically processed with truth values between 0.0 and 1.0. A state of a parameter may, for example, be normal or excessive or marginal with truth values between 0 and 1, according to a specific fuzzy set. However, for some parameters the fuzzy sets can essentially be Boolean sets comprising only true or false as values.

In an exemplary embodiment the rules for determining the outcome of the fuzzy logic are:

IF  (1)
  {pitch angle AND roll angle AND pitch rate AND captain roll command AND acceleration along the pitch axis} ARE {normal}
  AND
  {TAWS warning AND stall warning AND cabin altitude warning AND TCAS warning AND bad take-off warning} ARE {false}
THEN
  {no accident is occurring}
IF
  {pitch angle OR roll angle OR pitch rate OR roll command OR acceleration along the pitch axis} ARE {excessive}
  OR  (2)
  {TAWS warning OR stall warning OR cabin altitude warning OR TCAS warning OR bad take-off warning} ARE {true}
THEN
  {accident is occurring}
IF
  {pitch angle AND roll angle AND pitch rate} ARE {marginal}
  OR  (3)
  {acceleration along the pitch axis} IS {marginal}
THEN
  {accident is occurring}

In the rules "IF", "AND", "OR", "IS/ARE" and "THEN" are operators of the fuzzy logic.

The parameters are evaluated to determine a risk level of an aircraft emergency using fuzzy functions and defuzzification methods known to the skilled person. A risk level can, for example, be a value between 0.0 and 1.0, wherein a risk level of 0.0 indicates that a probability of an aircraft emergency is 0, whereas a risk level of 1.0 indicates that an aircraft emergency is certain.

Once the risk or risk level for an aircraft emergency has been determined in one part, at least a first emergency measure is triggered in a further part of the method if the risk level exceeds a predetermined first threshold. In other words, the determined risk level is compared to a first threshold and if the risk level is greater than or in an exemplary embodiment also when it is equal to the first threshold, the first emergency measure is triggered.

Thus, before any comparison can be performed a first threshold needs to be defined in a further part of the method. According to the present disclosure the first threshold is determined according to a position or location of an aircraft over ground. The method uses, for example, a position determined by a satellite positioning system such as GPS, Glonass, Galileo or Beidou to determine a location of the aircraft over ground. Based on this position the first threshold is determined. Several approaches are conceivable to determine the first threshold. Some of these approaches form exemplary embodiments of the present disclosure.

The first threshold can be determined after the risk level has been determined as described above. It is also possible to determine the first threshold before the risk level or to determine both the first threshold and the risk level permanently and in parallel and to compare the currently determined first threshold with the currently determined risk level every time the risk level or the first threshold have changed.

By using the position over ground to vary or adjust the threshold the triggering of various emergency measures can advantageously be improved. If, for example, an aircraft is flying across polar regions were the band width for data transmission via satellites is low, a first threshold for a first emergency measure in form of a data transmission may be reduced. Thus, in case of an aircraft emergency data transmission commences earlier such that sufficient data is transmitted before the aircraft emergency actually happens. However, lowering the first threshold increases the risk of false positive results of the logic which can trigger unnecessary and expensive emergency measures such as rescue operations. Thus, where sufficient bandwidth for data transmission via satellites is present, the first threshold can be determined to a greater value such that the data transmission is only triggered if the chance of an aircraft emergency occurring is higher and fewer false alarms are caused.

In other words, a method according to the present disclosure can advantageously be used in different ways to improve the effectiveness of the triggering of a first emergency measure. On the one hand, in other geographic locations emergency measures can be triggered earlier to ensure that they are completely carried out in time before the actual emergency happens, on the other hand emergency measures can be delayed in other regions to avoid false positive detections in regions where less time is required to carry out the emergency measure.

In a preferred embodiment the method comprises triggering a second emergency measure associated with an aircraft emergency if the risk level exceeds a second threshold for the second emergency measure. The second threshold differs from the first threshold and the second threshold is adjusted according to the position of the aircraft over ground. In the preferred embodiment two different emergency measures are advantageously triggered by different thresholds, i.e. a first emergency measure is triggered if the risk level exceeds a first threshold and a second emergency measure is triggered if the risk level exceeds a second threshold. Both the first and second threshold are adjusted independently of one another according to the position of the aircraft over ground. This does not only allow to trigger different emergency measures at different risk levels but also to use the geographic information for different emergency measures in a different manner to account for specific aspects of each of the first and the second emergency measure.

For example, a first emergency measure can be a transmission of flight data that is commonly stored in the flight recorder and a second emergency measure can be an activation of an Emergency Locator Transmitter. Thus, the transmission of flight data via a satellite data transmission system can be triggered at a significantly lower risk level as it does not necessarily indicate an aircraft emergency. The position of the aircraft over ground can be used to vary the threshold in accordance with a bandwidth of the satellite data transmission system. Activating an Emergency Locator Transmitter immediately notifies the rescue control centers which will commence expensive rescue operations. Thus, to avoid unnecessary costs the Emergency Locator Transmitter should only be activated or triggered at a higher risk level. Thus, the second threshold will be set to a considerably greater value than the first threshold. However, if the aircraft is over open water the Emergency Locator Transmitter should be activated earlier than if the aircraft is flying over land as it is usually considerably more complicated to find a lost aircraft over sea than over land if the Emergency Locator Transmitter was not activated in time.

In a further preferred embodiment the position of the aircraft over ground is evaluated to determine if the aircraft is flying over sea or land and the first and/or second threshold are adjusted to a different value if it has been determined that the aircraft is flying over sea than if it has been determined that the aircraft is flying over land. Preferably the first and/or the second threshold are adjusted such that the first and/or the second emergency measure are triggered at a lower risk level if it has been determined that the aircraft is flying over sea than if it has been determined that the aircraft is flying over land.

Thus, according to the preferred embodiment for at least one of the first and/or second emergency measure the first and/or the second threshold are adjusted according to a simple map or function where each position over ground is assigned to being either sea or land. An Emergency Locator Transmitter may, for example, be activated at a lower risk level if an aircraft is over sea than if it is over land. In other words, if the first emergency measure is the activation of an Emergency Locator Transmitter, the first threshold is determined to a lower value if the aircraft is flying over sea than if the aircraft is flying over land.

Alternatively or additionally in another preferred embodiment based on the position of the aircraft over ground it is determined if the aircraft is within a predefined region around an airport. The first and/or the second threshold are adjusted to a different value if it has been determined that the aircraft is within a predefined region around an airport than if it has been determined that the aircraft is not within a predefined region around an airport. Preferably, the first and/or second threshold are adjusted such that the first and/or the second emergency measure are triggered at a lower risk level if it has been determined that the aircraft is not within a predefined region around an airport than if it has been determined that the aircraft is within a predefined region around an airport.

According to the preferred embodiment the first and/or second threshold are adjusted to different values if the aircraft is within or outside of a predetermined region around an airport. The predetermined region can, for example, be defined as a given radius around an airport, e.g. a 25 nautical miles radius, or the approach corridors of an airport. Advantageously the first and/or the second threshold are increased if it has been determined that the aircraft is within a predefined region around an airport.

Thus, the respective first and/or second emergency measures are only triggered if the risk level of an aircraft accident is higher. Thereby, false alerts are prevented that are more likely in the vicinity of airports where aircraft are flying lower and have to perform more distinct flight maneuvers.

It is evident to the skilled person that different embodiments of the present disclosure can be combined, e.g. the first and/or second threshold can be adjusted to different values when the aircraft is flying within a region around an airport over sea or land, respectively. Furthermore, the present disclosure has been described with respect to a first and a second emergency measure having respective first and second thresholds. A method according to the present disclosure can also be applied for more than two emergency measures wherein for each emergency measure a different threshold can be determined or several emergency measures can be triggered if the same threshold is exceeded by the risk level.

In a second aspect the present disclosure relates to a system for use onboard an aircraft for triggering a first emergency measure associated with an emergency of the aircraft. The system comprises a control unit that is adapted to receive a plurality of flight parameters and/or aircraft parameters from a control system of the aircraft comprising a position of the aircraft over ground. The control unit is further adapted to determine a risk level for an aircraft emergency and to trigger the first emergency measure if the risk level exceeds a first threshold for the first emergency measure. The risk level is determined by evaluating a plurality of flight parameters and/or aircraft parameters received from the control system using a predefined logic. The control unit is adapted to adjust the first threshold according to the position of the aircraft over ground received from the control system.

In other words in a second aspect the present disclosure relates to a system for use onboard an aircraft that can perform a method according to any of the preceding embodiments. Thus, all specific embodiments and advantages described in the preceding paragraphs apply to those embodiments of the system that comprise device features that correspond to the method features of the respective embodiments of the method according to the present disclosure.

For performing the methods according to the present disclosure the system comprises a control unit which can be, for example, a data processing unit comprising the respective ports or connectors for connecting the control unit to a control system of an aircraft to receive the required flight parameters and/or aircraft parameters. The control unit can, for example, be adapted by providing software on which the control unit operates or by providing a control unit which has specific hard-wired or hardware features. Also mixed embodiments are possible where some features are provided in the form of software whereas other features are provided in form of hardware.

The control unit is preferably adapted to trigger a second emergency measure associated with an aircraft emergency if the risk level exceeds a second threshold for the second emergency measure, wherein the second threshold differs from the first threshold and the control unit is adapted to adjust the second threshold according to the position of the aircraft over ground received from the control system.

It is further preferred that the control unit is adapted to evaluate the position of the aircraft over ground to determine if the aircraft is flying over sea or land and to adjust the first and/or second threshold to a different value if it has been determined that the aircraft is flying over sea than if it has been determined that the aircraft if flying over land. The control unit is preferably adapted to adjust the first and/or second threshold such that the first and/or the second emergency measure are triggered at a lower risk level if it has been determined that the aircraft is flying over sea than if it has been determined that the aircraft is flying over land.

In a further preferred embodiment the control unit is adapted to determine based on the position of the aircraft over ground received from the control system if the aircraft is within a predefined region around an airport. The control unit is also adapted to adjust the first and/or second threshold to a different value if it has been determined that the aircraft is within a predefined region around an airport than if it has been determined that the aircraft is not within a predefined region around an airport. Preferably, the control unit is adapted to adjust the first and/or second threshold such that the first and/or the second emergency measure are triggered at a lower risk level if it has been determined that the aircraft is not within a predefined region around an airport than if it has been determined that the aircraft is within a predefined region around an airport.

The first and/or the second emergency measure are preferably one of an activation of an Emergency Locator Transmitter, a data transmission or an arming of a Deployable Flight Recorder, respectively.

Further, the control unit is preferably adapted to determine the risk level by evaluating a plurality of flight parameters and/or aircraft parameters received from the control system using a predefined fuzzy logic.

In a third aspect an object is solved by an aircraft comprising a system according any of the preceding preferred embodiments. The aircraft shares all advantages of the respective embodiments of the system comprised by the aircraft.

BRIEF DESCRIPTION OF THE DRAWINGS

In the following an exemplary embodiment of a method and an exemplary embodiment of a system according to the present disclosure will be explained in more detail with reference to the drawings, wherein.

DETAILED DESCRIPTION

Figure 1:
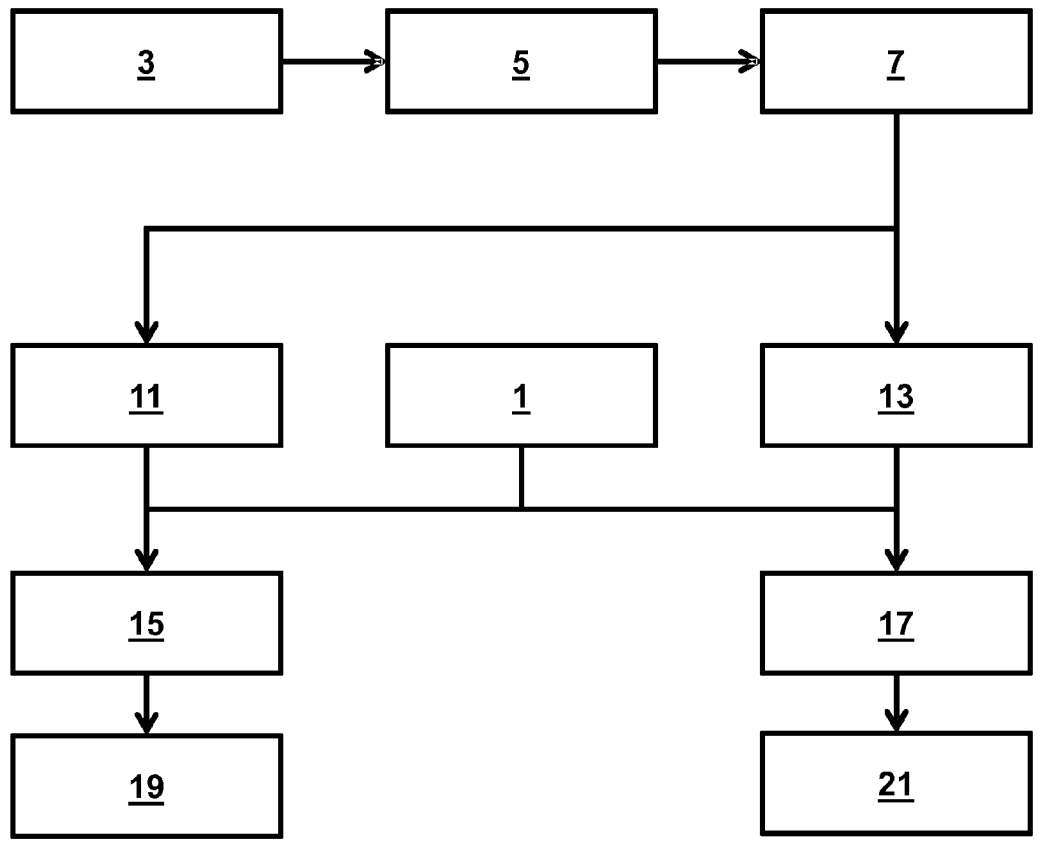
FIG. 1 shows a flow chart of an exemplary embodiment of a method according to the present disclosure.

In FIG. 1 a flowchart of an exemplary embodiment of a method for triggering a first and a second emergency measure according to the present disclosure is shown. The method can comprise three different aspects: determining a risk level for an aircraft emergency, adjusting a first and a second threshold for triggering a first and a second emergency measure, respectively, and triggering the first and the second emergency measure if the risk level exceeds the first and the second threshold, respectively. In the exemplary embodiment shown in FIG. 1 the risk level is determined independently of the adjustment of the thresholds and every time a new risk level has been determined or one of the thresholds has been adjusted, the risk level is compared to the first and the second threshold and the first and the second emergency measure are triggered if the risk level exceeds the respective threshold.

Thus, in a risk level determination part 1 of the method a risk level for an aircraft emergency is determined by evaluating a plurality of flight parameters and aircraft parameters using a predefined fuzzy logic. In the exemplary embodiment of FIG. 1 the parameters may include a roll angle and a roll rate of the aircraft, a pitch angle and a pitch rate, a vertical speed, i.e. a climb rate or rate of descent of the aircraft, a calibrated airspeed (CAS), an indicated airspeed (IAS), an acceleration of the aircraft along the yaw or normal axis or the pitch or lateral axis, a radio altitude (i.e. an altitude above ground), roll and rudder commands and engine parameters. Further, parameters indicating a flight situation such as a stall warning, an overspeed warning, a terrain awareness and warning system (TAWS) warning, a traffic alert and collision avoidance system (TCAS) warning, a bad take-off warning and a cabin altitude warning may also be evaluated. The rules for determining the outcome of the fuzzy logic are:

IF
  {pitch angle AND roll angle AND pitch rate AND captain roll command AND acceleration along the pitch axis} ARE {normal}
  AND
  {TAWS warning AND stall warning AND cabin altitude warning AND TCAS warning AND bad take-off warning} ARE {false}
THEN
  {no accident is occurring}     (4)

IF
  {pitch angle OR roll angle OR pitch rate OR roll command OR acceleration along the pitch axis} ARE {excessive}
  OR
  {TAWS warning OR stall warning OR cabin altitude warning OR TCAS warning OR bad take-off warning} ARE {true}
THEN
  {accident is occurring}     (5)

IF
  {pitch angle AND roll angle AND pitch rate} ARE {marginal}
  OR
  {acceleration along the pitch axis} IS {marginal}
THEN
  {accident is occurring}     (6)

In the rules "IF", "AND", "OR", "IS/ARE" and "THEN" are operators of the fuzzy logic. The state of the parameters is described using standard fuzzy functions that are known to the person skilled in the art. Likewise, several different defuzzyfication methods can be used to determine the outcome of the rules. The result of the rules is a risk level that can be somewhere between 0.0 and 1.0, wherein 0.0 indicates that the risk of an aircraft emergency occurring is zero, whereas 1.0 indicates that it is certain that an aircraft emergency will occur.

In order to determine the first and the second threshold in a first step 3 a position or location of the aircraft over ground is determined. The position can be determined, for example, using a satellite positioning system or satellite navigation system such as GPS, GLONASS, Galileo or Beidou. It is, however, also possible that the position is obtained by using other positioning approaches especially when the aircraft is within vicinity of an airport. Once the position over ground has been determined in a second step 5 it is determined whether the aircraft is flying over sea or land. To this end the method uses a worldwide map defining for every position whether it is land or sea. The definition may be a rough approximation, i.e. positions are only classified according to a coarse grid.

In a further step 7 it is to be determined whether the aircraft is within a region around an airport. In the exemplary embodiment shown in FIG. 1, an aircraft is defined to be within the region around an airport if it is no further away than 25 nautical miles from the airport. Thus, a region around an airport is defined as an approximate circle having a radius of 25 nautical miles around an airport. In other embodiments the region may have irregular shapes and can, for example, be defined by the approach or landing corridors of an airport.

Once all these steps 3, 5, 7 have been accomplished in two separate final steps 11, 13 the first and the second threshold are adjusted, respectively.

In the exemplary embodiment the first emergency measure is an activation of an Emergency Locator Transmitter. The Emergency Locator Transmitter will be activated in a trigger step 19 if in a comparison step 15 it has been determined that the first threshold adjusted in step 11 is less than the risk level determined in the risk level determination step 1. The second emergency measure triggered in the trigger step 21 is the arming of a Deployable Flight Recorder. The data recorder will be armed in the trigger step 21 if in the comparison step 17 it has been determined that the risk level exceeds the second threshold adjusted in step 13.

By introducing an additional emergency measure of arming a Deployable Flight Recorder, advantageously unintended ejections of the flight recorder due to a malfunction of an ejection control that is independent of the present triggering method are prevented.

In step 11 the first threshold is determined as a function of the position of the aircraft over sea or land and within a region around an airport or outside a region around an airport. The first threshold is adjusted in that the Emergency Locator Transmitter is activated at a lower risk level if the aircraft is flying over sea than if it is flying over land. Likewise, the first threshold is adjusted such that it is activated at a lower risk level if the aircraft is not located within a predefined region around an airport than if it is located within a predefined region around an airport. The second threshold is adjusted similarly in the additional step 13. Thereby, the first and second threshold will in most cases have different values. However, it is possible that in some scenarios the first and the second threshold are identical.

The exemplary embodiment of FIG. 1 comprises only two different emergency measures. It is, however, possible to extend the method according to the present disclosure to more than two emergency measures, for example, by introducing further thresholds or by activating more than one emergency measure if the risk level exceeds one of the thresholds. Furthermore, not all thresholds have to be adjusted as a function of the outcome of all steps 5, 7. It is, for example, possible to adjust one of the thresholds only on the basis of a land/sea distinction according to step 5, whereas another threshold is adjusted in dependence on the results of all steps 5, 7.

The exemplary embodiment of a method shown in FIG. 1 improves the efficiency of a pre-crash or pre-impact activation of emergency measures by allowing on the one hand for an earlier activation or triggering of an Emergency Locator Transmitter if an aircraft is flying further away from an airport or over the sea and on the other hand preventing costly false triggering of the first and the second emergency measure if an aircraft is within a predefined region around an airport where more distinctive or pronounced flight maneuvers are expected without being an indication of a malfunction of the aircraft or an aircraft emergency.

Figure 2:
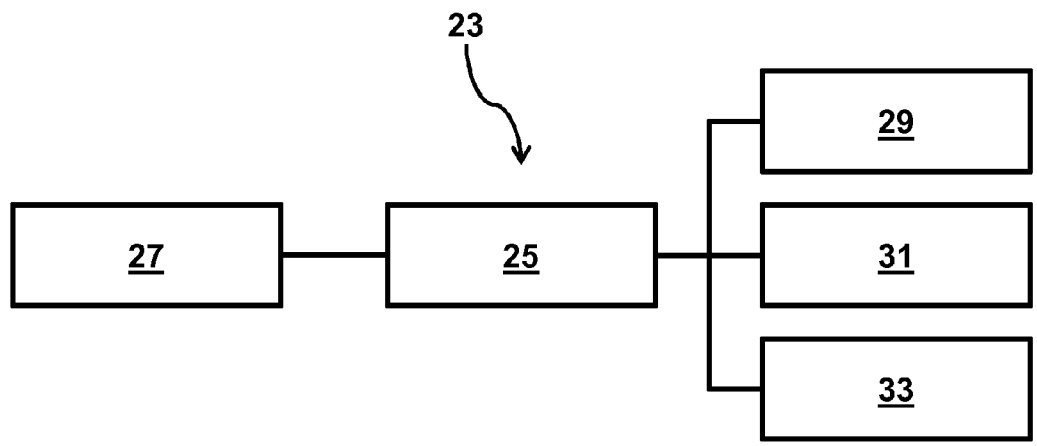
FIG. 2 shows a schematic drawing of an exemplary embodiment of a system according to the present disclosure.

Finally, in FIG. 2 an exemplary embodiment of a system 23 for triggering a plurality of emergency measures is shown. The system 23 comprises a control unit 25 onboard an aircraft (not shown) that is functionally connected to an aircraft control system or simply control system 27 and three emergency measures 29, 31, 33. The emergency measures 29, 31, 33 comprise an activation of an Emergency Locator Transmitter 29, an arming of a Deployable Flight Recorder 31 and a data transmission 33. The control unit 25 is a data processing unit, e.g. in form of a conventional computer or a microcontroller, that is connected to the control system 27 of the aircraft such that it can receive all flight and aircraft parameters required to determine a risk level for an aircraft emergency and to adjust thresholds for triggering emergency measures 29, 31, 33.

On the control unit 25 an exemplary embodiment of a method according to the present disclosure as shown in FIG. 1 is implemented in software. By the software the control unit 25 is adapted to evaluate the flight and aircraft parameters received from the control system 27 to determine a risk level and at least two thresholds as described with respect to FIG. 1. Furthermore, the control unit 25 is also adapted by software installed or provided on the control unit 25 to compare the determined thresholds and the determined risk level. If the risk level exceeds a threshold, the control unit 25 is adapted to trigger the respective emergency measure associated with that threshold. In the exemplary embodiment of the system 23 shown in FIG. 2 two thresholds are determined. Two emergency measures 29, 33 are associated with the first threshold. Hence, if the risk level exceeds the first threshold, the control unit 25 triggers or activates the Emergency Locator Transmitter 29 and the data transmission 31. If the risk level exceeds the second threshold, the arming of the Deployable Flight Recorder 31 is triggered.

The exemplary embodiment of a system 23 according to the present disclosure shown in FIG. 2 shares the advantages of the exemplary embodiment of a method according to the present disclosure shown in FIG. 1.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for triggering a first emergency measure associated with an aircraft emergency comprising determining a risk level for an aircraft emergency and triggering the first emergency measure if the risk level exceeds a first threshold for the first emergency measure,
wherein the risk level is determined by evaluating a plurality of flight parameters or aircraft parameters using a predefined logic, and
wherein the first threshold is adjusted according to a position of an aircraft over ground, wherein the position of the aircraft over ground is evaluated to determine if the aircraft is flying over sea or land, and
wherein the first threshold is adjusted to a different value if it has been determined that the aircraft is flying over sea than if it has been determined that the aircraft is flying over land.

2. The method according to claim 1, wherein the method comprises triggering a second emergency measure associated with an aircraft emergency if the risk level exceeds a second threshold for the second emergency measure,
wherein the second threshold differs from the first threshold, and
wherein the second threshold is adjusted according to the position of the aircraft over ground.

3. The method according to claim 2, wherein the first or second threshold is adjusted such that the first or the second emergency measure is triggered at a lower risk level if it has been determined that the aircraft is flying over sea than if it has been determined that the aircraft is flying over land.

4. A method for triggering a first emergency measure associated with an aircraft emergency comprising determining a risk level for an aircraft emergency and triggering the first emergency measure if the risk level exceeds a first threshold for the first emergency measure,
wherein the risk level is determined by evaluating a plurality of flight parameters or aircraft parameters using a predefined logic, and
wherein the first threshold is adjusted according to a position of an aircraft over ground, wherein based on the position of the aircraft over ground it is determined that the aircraft is within a predefined region around an airport,
wherein the first threshold is adjusted to a different value if it has been determined that the aircraft is within a predefined region around an airport than if it has been determined that the aircraft is not within a predefined region around an airport.

5. The method according to claim 4, wherein the first threshold is adjusted such that the first emergency measure is triggered at a lower risk level if it has been determined that the aircraft is not within a predefined region around an airport than if it has been determined that the aircraft is within a predefined region around an airport.

6. The method according to claim 1, wherein the first emergency measure comprises an activation of an Emergency Locator Transmitter, a data transmission or an arming of a Deployable Flight Recorder.

7. The method according to claim 1, wherein the risk level is determined by evaluating a plurality of flight parameters or aircraft parameters using a predefined fuzzy logic.

8. A system for use onboard an aircraft for triggering a first emergency measure associated with an emergency of the aircraft, the system comprising a control unit,
wherein the control unit is adapted to receive a plurality of flight parameters or aircraft parameters from a control system of the aircraft comprising a position of the aircraft over ground, to determine a risk level for an aircraft emergency and to trigger the first emergency measure if the risk level exceeds a first threshold for the first emergency measure,
wherein the risk level is determined by evaluating a plurality of flight parameters or aircraft parameters received from the control system using a predefined logic, and
wherein the control unit is adapted to adjust the first threshold according to the position of the aircraft over ground received from the control system, wherein the control unit is adapted to evaluate the position of the aircraft over ground to determine if the aircraft is flying over sea or land, and to adjust the first threshold to a different value if it has been determined that the aircraft is flying over sea than if it has been determined that the aircraft is flying over land.

9. The system according to claim 8, wherein the control unit is adapted to trigger a second emergency measure associated with an aircraft emergency if the risk level exceeds a second threshold for the second emergency measure, wherein the second threshold differs from the first threshold and the control unit is adapted to adjust the second according to the position of the aircraft over ground received from the control system.

10. The system according to claim 8, wherein the control unit is adapted to adjust the first threshold such that the first emergency measure is triggered at a lower risk level if it has been determined that the aircraft is flying over sea than if it has been determined that the aircraft is flying over land.

11. A system for use onboard an aircraft for triggering a first emergency measure associated with an emergency of the aircraft, the system comprising a control unit,
wherein the control unit is adapted to receive a plurality of flight parameters or aircraft parameters from a control system of the aircraft comprising a position of the aircraft over ground, to determine a risk level for an aircraft emergency and to trigger the first emergency measure if the risk level exceeds a first threshold for the first emergency measure,
wherein the risk level is determined by evaluating a plurality of flight parameters or aircraft parameters received from the control system using a predefined logic, and
wherein the control unit is adapted to adjust the first threshold according to the position of the aircraft over ground received from the control system, wherein the control unit is adapted to determine based on the position of the aircraft over ground received from the control system if the aircraft within a predefined region around an airport, and
wherein the control unit is adapted to adjust the first threshold to a different value if it has been determined that the aircraft is within a predefined region around an airport than if it has been determined that the aircraft is not within a predefined region around an airport.

12. The system according to claim 11, wherein the control unit is adapted to adjust the first threshold such that the first emergency measure is triggered at a lower risk level if it has been determined that the aircraft is not within a predefined region around an airport than if it has been determined that the aircraft is within a predefined region around an airport.

13. The system according to claim 8, wherein the first emergency measure is one of an activation of an Emergency Locator Transmitter, a data transmission or an arming of a Deployable Flight Recorder, respectively.

14. The system according to claim 8, wherein the control unit is adapted to determine the risk level by evaluating a plurality of flight parameters or aircraft parameters received from the control system using a predefined fuzzy logic.

15. An aircraft comprising a system according to claim 8.

16. The method according to claim 4, wherein the position of the aircraft over ground is evaluated to determine if the aircraft is flying over sea or land, and
wherein the first threshold is adjusted to a different value if it has been determined that the aircraft is flying over sea than if it has been determined that the aircraft is flying over land.

17. The system according to claim 11, wherein the control unit is adapted to evaluate the position of the aircraft over ground to determine if the aircraft is flying over sea or land, and
to adjust the first threshold to a different value if it has been determined that the aircraft is flying over sea than if it has been determined that the aircraft is flying over land.

18. The method according to claim 1, wherein based on the position of the aircraft over ground it is determined if the aircraft is within a predefined region around an airport,
wherein the first threshold are adjusted to a different value if it has been determined that the aircraft is within a predefined region around an airport than if it has been determined that the aircraft is not within a predefined region around an airport.

19. The system according to claim 8, wherein the control unit is adapted to determine based on the position of the aircraft over ground received from the control system if the aircraft within a predefined region around an airport, and
wherein the control unit is adapted to adjust the first threshold to a different value if it has been determined that the aircraft is within a predefined region around an airport than if it has been determined that the aircraft is not within a predefined region around an airport.

* * * * *